(12) United States Patent
Stewart et al.

(10) Patent No.: US 9,499,083 B2
(45) Date of Patent: Nov. 22, 2016

(54) TRAY TABLE STRUCTURE

(71) Applicant: Zodiac Seats US LLC, Gainesville, TX (US)

(72) Inventors: Christopher Stewart, Saint Jo, TX (US); John D. Allen, Sanger, TX (US); Guorong Zhu, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/231,961

(22) Filed: Apr. 1, 2014

(65) Prior Publication Data

US 2014/0292042 A1 Oct. 2, 2014

Related U.S. Application Data

(60) Provisional application No. 61/807,021, filed on Apr. 1, 2013.

(51) Int. Cl.
*A47B 83/02* (2006.01)
*B60N 3/00* (2006.01)

(52) U.S. Cl.
CPC ..................... *B60N 3/004* (2013.01)

(58) Field of Classification Search
CPC ............................... B60N 3/002; B60N 3/004
USPC ........ 108/901, 902, 57.25, 132, 129, 44, 47, 108/48, 152; 297/146, 147, 148, 154, 163, 297/135
See application file for complete search history.

(56) References Cited

U.S. PATENT DOCUMENTS

| 2,539,785 A | 1/1951 | Kell |
| 3,321,253 A | 5/1967 | Everburg |
| 3,424,110 A * | 1/1969 | Toot .......................... 108/53.3 |
| 3,586,394 A | 6/1971 | Hecksel |
| 3,738,725 A | 6/1973 | Visser |
| 4,141,586 A | 2/1979 | Goldner et al. |
| 4,189,125 A * | 2/1980 | Little ....................... 248/346.02 |
| 4,526,421 A | 7/1985 | Brennan et al. |
| 5,018,800 A | 5/1991 | Cziptschirsch et al. |
| 5,042,396 A * | 8/1991 | Shuert ....................... 108/57.25 |
| 5,104,191 A | 4/1992 | Tame |
| 5,205,221 A * | 4/1993 | Melin et al. ................. 108/51.3 |
| 5,249,881 A | 10/1993 | Austin et al. |
| 5,340,059 A | 8/1994 | Kanigowski |
| 5,413,414 A | 5/1995 | Bauer |
| 5,556,170 A | 9/1996 | Lai et al. |
| 5,579,557 A | 12/1996 | Boden |

(Continued)

FOREIGN PATENT DOCUMENTS

| WO | 03064207 | 8/2003 |
| WO | 2009076453 | 6/2009 |

OTHER PUBLICATIONS

International Patent Application No. PCT/US2008/086253, Search Report and Written Opinion mailed Jun. 12, 2009.

(Continued)

*Primary Examiner* — Jose V Chen
(74) *Attorney, Agent, or Firm* — Kilpatrick Townsend & Stockton LLP; Dean W. Russell; Tiffany L. Williams

(57) ABSTRACT

Described are tray table assemblies comprising a table body including a frame. The frame is formed of an upper bar and a lower bar that connect a pair of slide guides, wherein the upper bar, the lower bar, and the pair of slide guides are integrally formed as a single piece.

13 Claims, 4 Drawing Sheets

(56) References Cited

U.S. PATENT DOCUMENTS

| | | | |
|---|---|---|---|
| 5,947,037 A * | 9/1999 | Hornberger et al. | 108/115 |
| 6,250,234 B1 * | 6/2001 | Apps | 108/57.25 |
| 6,267,337 B1 | 7/2001 | Kulhavy | |
| 6,354,658 B1 * | 3/2002 | Sher et al. | 297/188.14 |
| 6,484,450 B1 | 11/2002 | Suprina et al. | |
| 6,619,733 B2 | 9/2003 | Pearson | |
| 6,742,840 B2 | 6/2004 | Bentley | |
| 6,805,403 B2 | 10/2004 | Buch | |
| 6,814,404 B2 * | 11/2004 | Jensen | 297/146 |
| 6,976,597 B2 | 12/2005 | Jahrling et al. | |
| 7,004,430 B2 * | 2/2006 | Weekly | 244/129.1 |
| 7,328,663 B2 * | 2/2008 | Leng | 108/157.14 |
| 7,621,593 B2 | 11/2009 | Dickinson | |
| 7,698,872 B2 * | 4/2010 | Clark et al. | 52/783.1 |
| 7,748,196 B2 * | 7/2010 | Gula et al. | 52/783.1 |
| 8,312,819 B2 | 11/2012 | Vignal et al. | |
| 8,534,029 B2 * | 9/2013 | Leng | 52/796.11 |
| 8,905,470 B2 * | 12/2014 | Shih et al. | 297/163 |
| 2003/0094843 A1 | 5/2003 | Jensen et al. | |
| 2007/0283855 A1 | 12/2007 | Pozzi | |

OTHER PUBLICATIONS

U.S. Appl. No. 12/332,108, Notice of Allowance mailed Sep. 18, 2012.

U.S. Appl. No. 12/332,108, Response to Non-Final Office Action mailed Jul. 16, 2012.

U.S. Appl. No. 12/332,108, Non-Final Office Action mailed Apr. 16, 2012.

U.S. Appl. No. 12/332,108, Request for Continued Examination mailed Nov. 17, 2011.

U.S. Appl. No. 12/332,108, Advisory Action mailed Nov. 7, 2011.

U.S. Appl. No. 12/332,108, Response to Final Office Action mailed Oct. 31, 2011.

U.S. Appl. No. 12/332,108, Final Office Action mailed Aug. 30, 2011.

U.S. Appl. No. 12/332,108, Response to Non-Final Office Action mailed Jun. 7, 2011.

U.S. Appl. No. 12/332,108, Non-Final Office Action mailed Apr. 29, 2011.

* cited by examiner

TRAY TABLE STRUCTURE

CROSS REFERENCE TO RELATED APPLICATIONS

This application is related to and claims priority benefits from U.S. Provisional Application Ser. No. 61/807,021 ("the '021 application"), filed on Apr. 1, 2013, entitled TRAY TABLE STRUCTURE. The '021 application is hereby incorporated in its entirety by this reference.

FIELD OF THE INVENTION

The field of the invention relates to passenger seats or the like and more particularly to tray tables for use with passenger seats.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort, many passenger seat backs rotate between upright and reclined positions.

In some instances, a tray table may be mounted adjacent the back of each passenger seat for use by a passenger in the next aft passenger seat. The tray table is deployed by the passenger to provide a relatively flat surface for eating, working, recreation, or other uses.

In many conventional uses, the tray table may be mounted to the back of each passenger seat via a pair of retractable arms that allow the tray table to be pulled toward the passenger when deployed.

As shown in FIGS. 2-3, in a conventional configuration, a pair of slide guides 18 are coupled to the sides of an internal aluminum structure that forms the table body of the tray table. Because the slide guides 18 are formed individually and attached to the internal aluminum structure, an unnecessary tolerance stack build-up may occur between the various components, leading to potentially non-parallel slide guides 18 that have inferior sliding properties due to the lack of alignment along a sliding plane.

In certain situations, it may be desirable to reduce the amount of tolerance stack build-up between the slide guides 18 and/or to provide a more rigid structure that prevents warpage of the plane between the slide guides 18, while also providing a lightweight and durable tray table.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table assembly comprises a table body comprising a frame, the frame comprising an upper bar and a lower bar that connect a pair of slide guides, wherein the upper bar, the lower bar, and the pair of slide guides are integrally formed as a single piece.

According to various embodiments of the present invention, a tray table assembly comprises a table body comprising an upper bar connecting a first end of each of a pair of slide guides, a lower bar connecting a second end of each of the pair of slide guides, and a pair of diagonal supports, each of the pair of diagonal supports connecting the first end of one of the pair of slide guides to the second end of another one of the pair of slide guides, wherein the upper bar, the lower bar, the pair of slide guides, and the pair of diagonal supports are integrally formed as a single piece.

According to additional embodiments of the present invention, a passenger seat comprises the tray table assembly described in the above embodiments, a first end of each of a pair of retractable arms coupled to each of the pair of slide guides, and a second end of each of the pair of retractable arms pivotally coupled to a seat back.

In some embodiments, the table body is formed of aluminum, stainless steel, aramid fibers, polycarbonate, or polypropylene. The table body may comprise a honeycomb internal structure.

In certain embodiments, the table body has a thickness that is not greater than approximately one-half inch and/or may be configured to substantially fit within a recess formed in a seat back of a passenger seat. According to some embodiments, a first end of each of a pair of retractable arms is coupled to the pair of slide guides, and a second end of each of the pair of retractable arms is pivotally coupled to the seat back.

In some embodiments, the pair of slide guides are oriented substantially parallel to each other. In additional embodiments, there is no tolerance stack build-up between the pair of slide guides.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide tray tables for passenger seats. While the tray tables are discussed for use with aircraft seats, they are by no means so limited. Rather, embodiments of the tray tables may be used in passenger seats or other seats of any type or otherwise as desired.

According to certain embodiments of the present invention, as shown in FIGS. 1 and 4-7, a tray table assembly 10 comprises a table body 12 and a cover 14.

Figure 4:
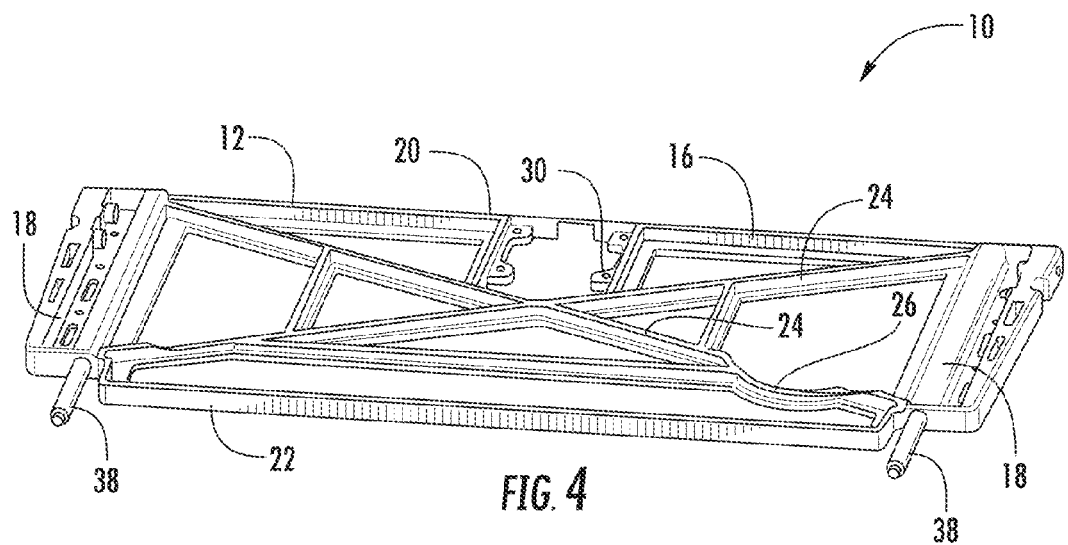
FIG. 4 is a perspective view of an aft/bottom side of the tray table assembly of FIG. 1 with a cover removed.
Figure 5:
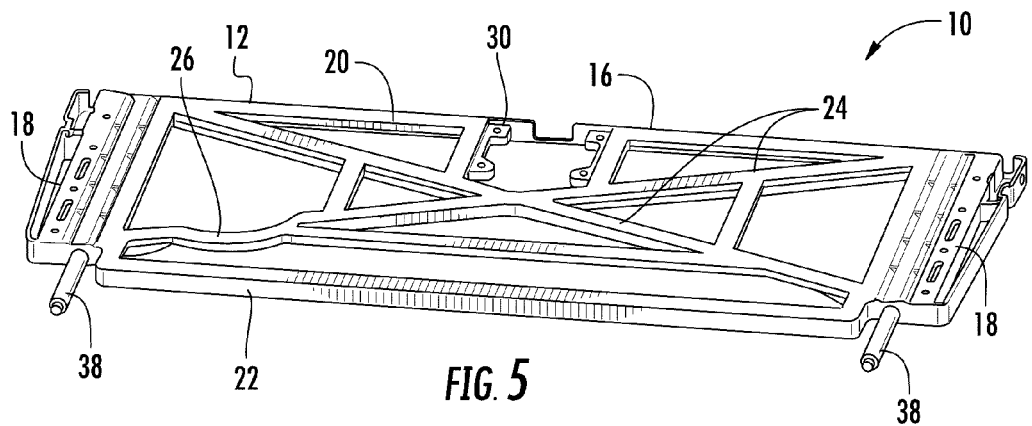
FIG. 5 is a perspective view of a forward/top side of the tray table assembly of FIG. 1 with the cover removed.
Figure 6:
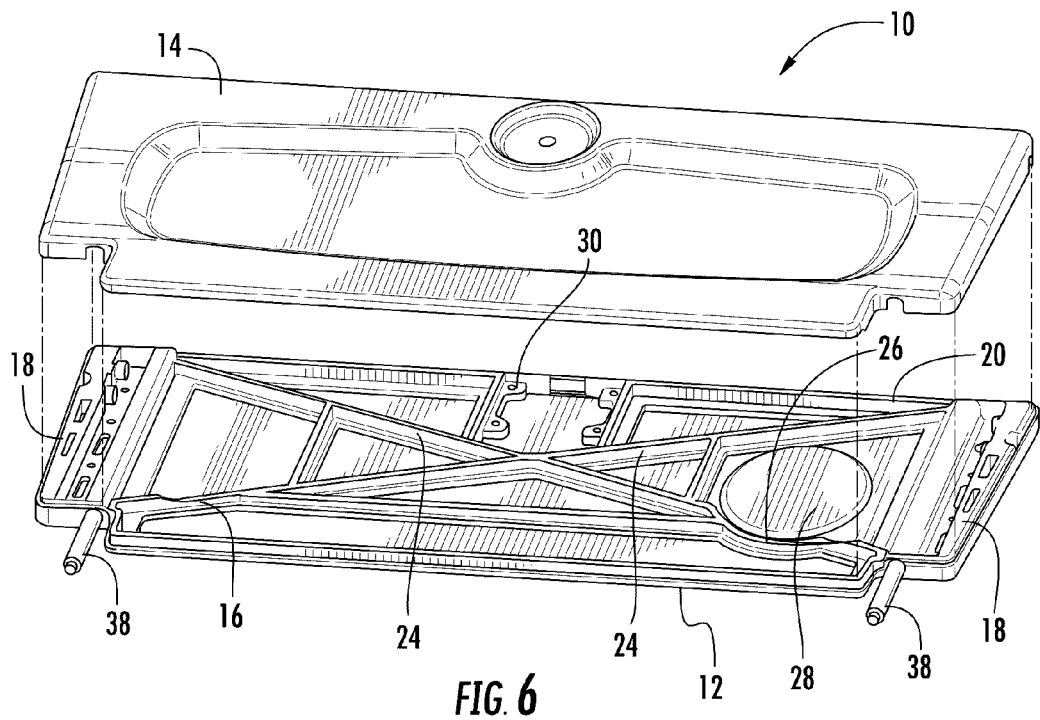
FIG. 6 is an expanded perspective view of a aft/bottom side of the tray table assembly of FIG. 1 with a cover.

In some embodiments, such as the embodiment illustrated in FIGS. 4-6, the internal structure of the table body 12 comprises a frame 16 that forms the outer perimeter of the table body 12. In these embodiments, two sides of the frame 16 comprise a pair of slide guides 18.

In addition to the slide guides 18 that form the sides of the frame 16, the frame 16 further comprises an upper bar 20 and a lower bar 22.

To prevent twisting or warping of the frame 16, a pair of diagonal supports 24 may be included within the frame 16 that connect the opposing corners of the frame 16. One or more of the diagonal supports 24 may be further shaped to provide sufficient space between the diagonal supports 24 for a recess 26 that is shaped to receive a cup holder 28.

Figure 1:
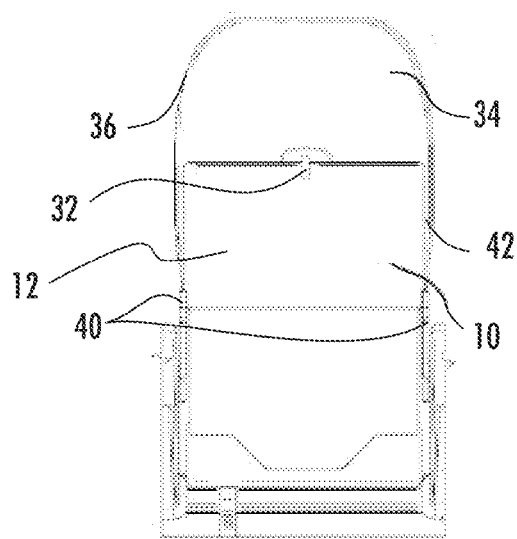
FIG. 1 is a rear view of a passenger seat with a tray table assembly, according to certain embodiments of the present invention.
Figure 2:
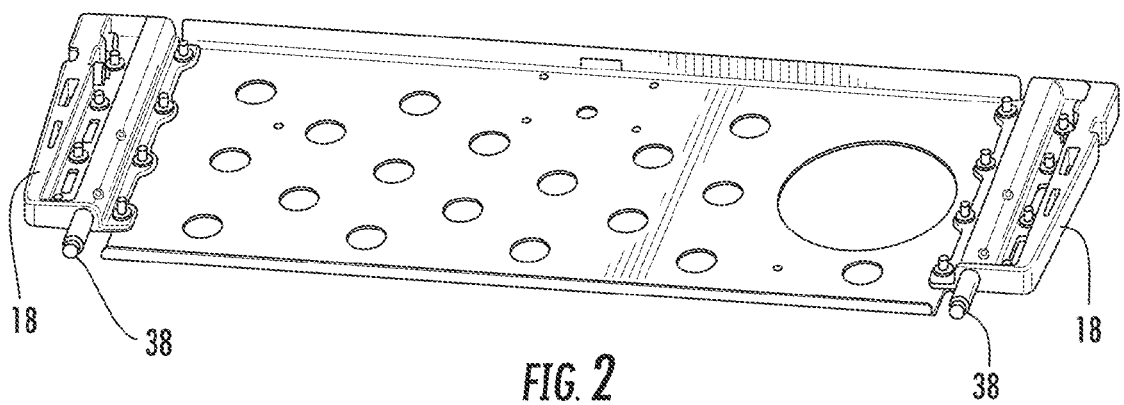
FIG. 2 is a perspective view of a conventional tray table assembly showing the connection between slide guides and an internal structure with a cover removed.
Figure 3:
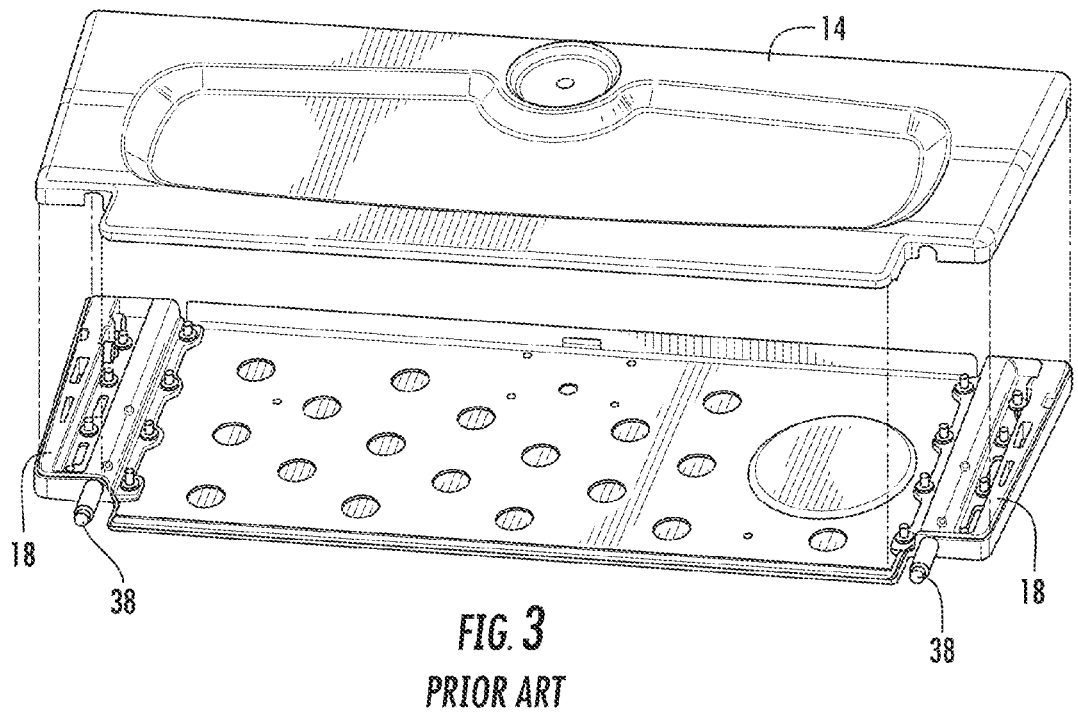
FIG. 3 is an expanded perspective view of the conventional tray table assembly of FIG. 2 with a cover.

In other embodiments, the table body 12 may have a honeycomb structure (as shown in FIGS. 2-3) in place of and/or in addition to the diagonal supports 24. Use of the diagonal supports 24 and/or honeycomb internal structure within the frame 16 provides the necessary structural integrity for the table body 12 while minimizing the weight of the table body 12.

In some embodiments, the upper bar 20 of the frame 16 may also include a coupling receptacle 30. The coupling receptacle 30 is the location where a coupling device 32 is connected to the tray table assembly 10 so as to releasably secure the tray table assembly 10 to a seat back 34 of a passenger seat 36.

Figure 7:
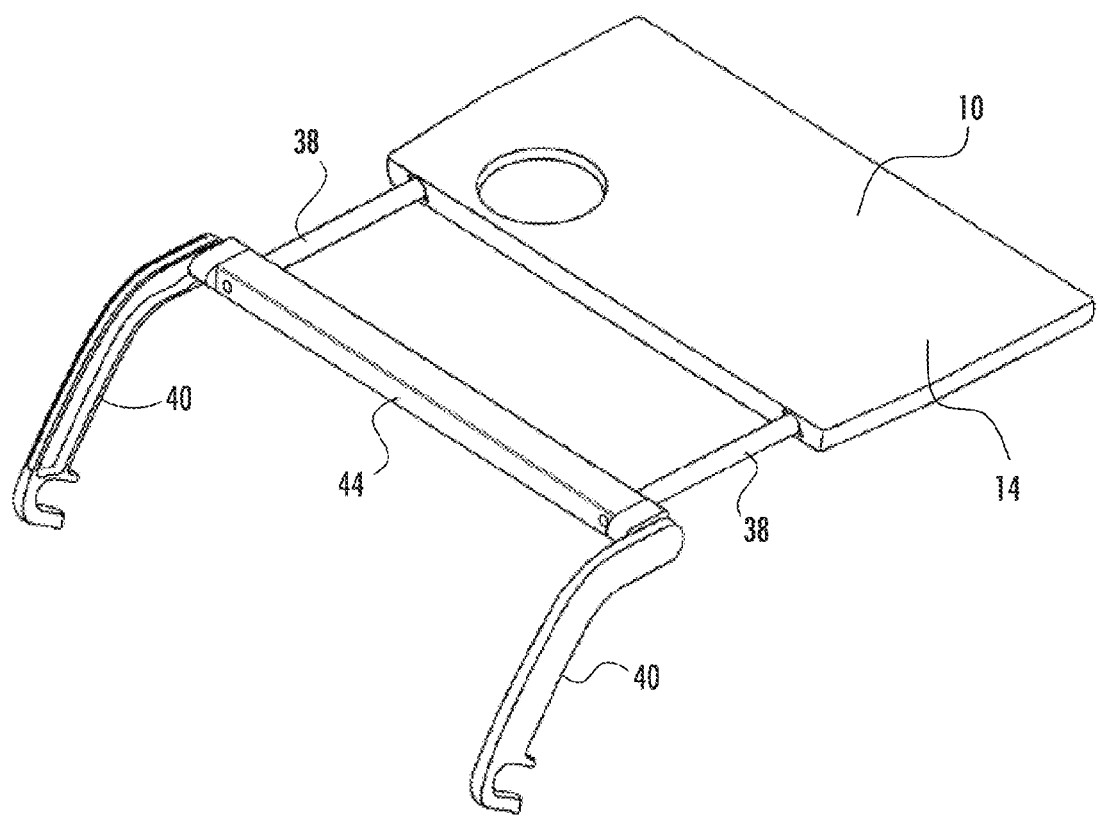
FIG. 7 is a perspective view of the tray table assembly of FIG. 1 coupled to arms that pivotally connect to the passenger seat of FIG. 1.

According to some embodiments, a shaft 38 extends from each of the pair of slide guides 18. U.S. Pat. No. 8,312,819, incorporated herein by reference, describes the details regarding the expansion and retraction operation of the slide guides 18 and the shafts 38, according to certain embodiments of the invention. As illustrated in FIG. 7, an end of each shaft 38 is connected to a first end of each of a pair of arms 40 via suitable fasteners, which include but are not limited to screws, bolts, rivets or other mechanical or chemical fasteners. In certain embodiments, a laterally extending rod 44 may be used to attach the ends of the shafts 38 to the arms 40, and which may provide additional lateral stability between the arms 40 and the shafts 38. A second end of each of the pair of arms 40 is pivotally connected to the seat back 34 via suitable fasteners, which include but are not limited to screws, bolts, rivets or other mechanical or chemical fasteners.

The table body 12 may be formed of materials including but not limited to aluminum, stainless steel, aramid fibers, polycarbonate, polypropylene, other metallic materials, composite materials, or other similar materials.

In certain embodiments, the table body 12 is formed as a single integral piece. In other words, rather than connecting the slide guides 18 to the frame 16, the entire frame 16, including the slide guides 18, is formed simultaneously as a single piece, thus substantially eliminating tolerance stack build-up between the slide guides 18. More specifically, in certain embodiments, the table body 12 may be injection or compression molded as a single piece including the slide guides 18, the entire frame 16, and the coupling receptacle 30.

In some embodiments, the table body 12 requires the cover 14 to provide an exterior shell for both eating and visual surfaces of the tray table assembly 10, as shown in FIGS. 4-7. The cover 14 may be formed of materials including but not limited to polycarbonate, polypropylene, other plastic materials, metallic materials, composite materials, or other similar materials. One of skill in the art will understand that any suitable cover and internal structure may be used to form the table body 12 that will provide a lightweight, slim table body 12 having sufficient strength to withstand forces that may be placed on the tray table assembly 10.

In certain embodiments, the integrally formed piece of table body 12 may also include molding one of the surfaces (eating or visual) as part of the single piece structure. These surfaces are currently separately attached as part of the cover 14, as described above. As a result, in these embodiments, the cover 14 would only be required for one of the two surfaces of the tray table assembly 10.

By way of background, tolerance stack build-up is the accumulated variation that is allowed by specified dimensions and tolerances among components. Thus, by manufacturing the table body 12 as a single piece, there are no variations in tolerances between the frame 16 and the two slide guides 18 so the two slide guides 18 remain oriented substantially parallel to each other and therefore provide a consistently parallel sliding mechanism for the tray table assembly 10.

Furthermore, in addition to substantially eliminating tolerance stack build-up, the integral formation of the frame 16 with the slide guides 18 and the diagonal supports 24 provides a rigid structure that is resistant to warpage or other torsional twisting.

In some embodiments, the table body 12 is configured to stow within a recess 42 formed in the seat back 34. In these embodiments, the recess 42 that may have any suitable shape including but not limited to rectilinear, trapezoidal, parabolic, or other suitable shape that does not exceed the outer perimeter of the seat back 34.

Likewise, because the table body is configured to stow within the seat back 34 to minimize the space occupied by the tray table assembly 10 when stowed, the table body 12 may have any suitable thickness that approximates the depth of the recess 42. For example, the thickness of the table body 12 may be any appropriate thickness that will allow the table body 12 to stow flush with an outer edge of the recess 42. In this embodiment, the thickness of the table body 12 is less than one inch, and preferably not greater than one-half inch. In other embodiments, it may be sufficient to partially stow the table body 12 within the recess 42, such that a portion of the table body 12 is partially surrounded by the recess 42, while another portion of the table body 12 extends into the space outside the recess 42.

The recess 42 may have any suitable depth that does not exceed the thickness of the seat back 34. In some embodiments, the depth of the recess 42 may have approximately the same dimension as the thickness of the seat back 34. In other embodiments, the depth of the recess 42 may be less than the thickness of the seat back 34. The appropriate size of the recess 42 and the thickness of the table body 12 for the various embodiments is dependent on, among other factors, the amount of cushioning desired for the seat back 34, the amount of space desired for the passenger, the size and material of the table body 12, and the amount of structural integrity required for the table body 12.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table assembly comprising:
   a pair of slide guides; and
   a table body positioned between the slide guides, the table body comprising a frame, the frame comprising an upper bar and a lower bar that connect the pair of slide guides in a substantially parallel alignment;
   wherein the upper bar, the lower bar, and the pair of slide guides are manufactured together as a unitary one-piece construction so that the substantially parallel alignment between the pair of slide guides does not vary due to a cumulative effect of part tolerances among individually-assembled components.

2. The tray table assembly of claim 1, wherein the table body is formed of aluminum, stainless steel, aramid fibers, polycarbonate, or polypropylene.

3. The tray table assembly of claim 1, wherein the table body has a thickness that is not greater than approximately one-half inch.

4. The tray table assembly of claim 1, wherein the tray table assembly is configured to substantially fit within a recess formed in a seat back of a passenger seat.

5. The tray table assembly of claim 4, wherein a first end of each of a pair of retractable arms is coupled to the pair of slide guides, and a second end of each of the pair of retractable arms is pivotally coupled to the seat back.

6. A passenger seat comprising:
   (a) a tray table assembly comprising
       a pair of slide guides; and
       a table body positioned between the slide guides, the table body comprising a frame, the frame comprising an upper bar and a lower bar that connect the pair of slide guides in a substantially parallel alignment,
       wherein the upper bar, the lower bar, and the pair of slide guides are manufactured together as a unitary one-piece construction so that the substantially parallel alignment between the pair of slide guides does not vary due to a cumulative effect of part tolerances among individually-assembled components;
   (b) a first end of each of a pair of retractable arms is coupled to each of the pair of slide guides; and
   (c) a second end of each of the pair of retractable arms is pivotally coupled to a seat back.

7. The tray table assembly of claim 6, wherein the table body is formed of aluminum, stainless steel, aramid fibers, polycarbonate, or polypropylene.

8. The tray table assembly of claim 6, wherein the table body has a thickness that is not greater than approximately one-half inch.

9. The tray table assembly of claim 6, wherein the tray table assembly is configured to substantially fit within a recess formed in the seat back of the passenger seat.

10. A tray table assembly comprising
    a pair of slide guides; and
    a table body positioned between the slide guides, the table body comprising:
    (a) upper bar connecting a first end of each of the pair of slide guides;
    (b) a lower bar connecting a second end of each of the pair of slide guides; and
    (c) a pair of diagonal supports, each of the pair of diagonal supports connecting the first end of one of the pair of slide guides to the second end of another one of the pair of slide guides;
    wherein the pair of slide guides are connected in a substantially parallel alignment;
    wherein the upper bar, the lower bar, the pair of slide guides, and the pair of diagonal supports are manufactured together as a unitary one-piece construction so that the substantially parallel alignment between the pair of slide guides does not vary due to a cumulative effect of part tolerances among individually-assembled components.

11. The tray table assembly of claim 10, wherein the table body is formed of aluminum, stainless steel, aramid fibers, polycarbonate, or polypropylene.

12. The tray table assembly of claim 10, wherein the table body has a thickness that is not greater than approximately one-half inch.

13. The tray table assembly of claim 10, wherein the tray table assembly is configured to substantially fit within a recess formed in a seat back of a passenger seat.

* * * * *